United States Patent [19]

Galic et al.

[11] Patent Number: 4,908,169
[45] Date of Patent: Mar. 13, 1990

[54] METHOD FOR PLASTICATING USING RECIPROCATING-SCREW HAVING A MELT CHANNEL AND SOLIDS CHANNEL

[76] Inventors: George J. Galic, 5140 St. Moritz Dr. NE., Columbia Heights, Minn. 55421; Steven M. Maus, 16220 Territorial Rd., Osseo, Minn. 55369

[21] Appl. No.: 201,771

[22] Filed: Jun. 2, 1988

Related U.S. Application Data

[63] Continuation-in-part of Ser. No. 929,399, Nov. 12, 1986, abandoned.

[51] Int. Cl.⁴ ............................................... B29C 45/50
[52] U.S. Cl. .................................. 264/40.2; 264/40.6; 264/328.14; 264/349; 366/90; 366/145; 366/146; 425/143; 425/208; 425/587
[58] Field of Search ...................... 366/79, 88, 90, 144, 366/145, 146; 264/40.2, 40.5, 40.7, 328.14, 349, 211.21, 40.6; 425/143, 144, 145, 162, 166, 206, 207, 208, 209, 587

[56] References Cited

U.S. PATENT DOCUMENTS 4,000,884  1/1977  Chung .................................. 366/88
4,501,498  2/1985  McKelvey ........................... 366/69

OTHER PUBLICATIONS

"Screw and Barrel Technology", Spirex Corporation, Youngstown, Ohio, 1985, booklet.
"Internally Heated Screw for all TG Injection Molding Machines", Reed-Prentice Division, Package Machinery Company, Mass., brochure.

Primary Examiner—Jill L. Heitbrink

[57]     ABSTRACT

Method for improved melt quality of thermoplastics processed in reciprocating-screw molding, especially optical injection molding processes. In a reciprocating-screw injection-drive unit (4) is a barrel (53) and screw (15). Screw (15) is double flighted throughout its melting or transition zone (2), to form melt channel (48) and solids channel (50) separated by melt-filtering flight element (47), and kept in fluid communication by melt-transfer apertures (47 or 55 or 56) or substantially non-vertical ramped barrier flight geometry (not shown). The largest energy input for melting is directly provided by thermal conductivity, via electrical resistance heating elements. The primary source of such heat is by such elements (35) mounted internal to screw (15), and operating in an open loop control with respect to melt temperature sensor (22); secondary heat sources are elements (12, 13, 14, 29) mounted external to barrel (53) and nozzle (33) and operating in a closed loop manner with respect to barrel temperature sensing device (17, 19, 21, 30) and/or melt temperature sensor (22). By screw geometry designed to keep the solids bed (24) continuously under compression and by suitable numbers and sizes of apertures (47 or 55 or 56), melt films are continuously transferred away from the screw's and barrel's heated surfaces as fast as they are formed, thereby minimizing residence times at peak temperature and maintaining maximal heat transfer rates.

20 Claims, 6 Drawing Sheets

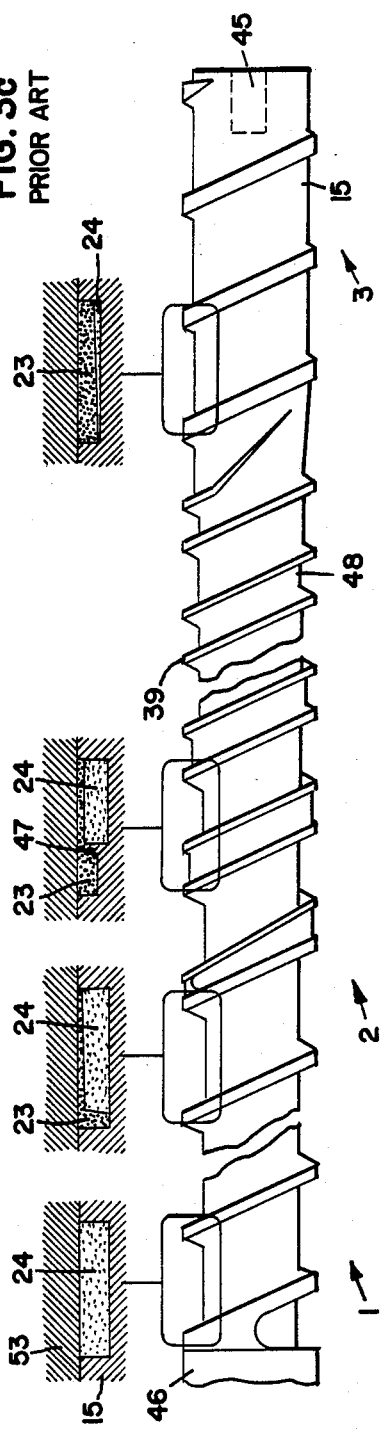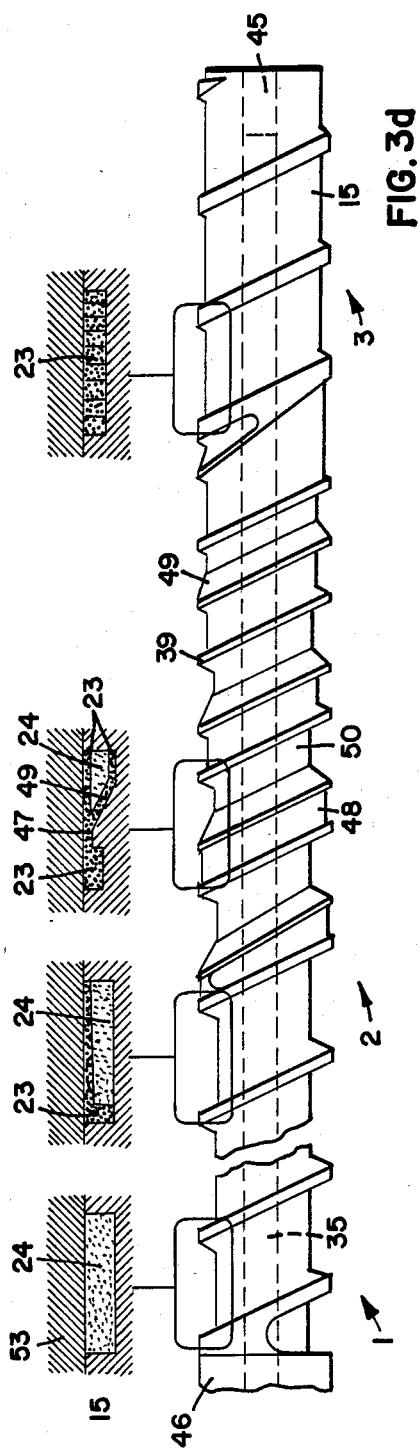

METHOD AND APPARATUS FOR IMPROVED MELT QUALITY PLASTICATION IN RECIPROCATING SCREW MOLDING PROCESSES

RECIPROCATING SCREW MOLDING PROCESSES

This application is a continuation-in-part of U.S. Pat. application Ser. No. 06/929,399 filed Nov. 12, 1986 now abandoned.

FIELD OF THE INVENTION

The present invention involves methods and apparatus for attaining improved melt quality of thermoplastics in reciprocating-screw injection molding and injection-blow molding processes.

BACKGROUND OF THE INVENTION

First, the special problems of screw extrusion compounding and fabrication processes and, second, problems of uniformly dispersing heterogeneous materials (particulate fillers, fibrous reinforcement, colorant pigments) throughout a polymer matrix in a plasticated fluid state, generally have preoccupied technical attentions to date. Consequently, relatively little innovation has been dedicated to the special needs of reciprocating-screw injection molding and injection-blow molding processes, especially with homogeneous thermoplastic. One such example use now emerging is injection molded 2D and 3D electrical circuit board substrates or connectors based on newer high performance engineering thermoplastics. PEI (polyether imide), PES (polyether sulphone), PEEK (polyether etherketone), PPS (polyphenylene sulfide) and the Liquid Crystal Polymers commonly require extraordinarily high melt processing temperatures (600–800° F.). Reference is made to "Keys to Predicting Processibility of Engineering Thermoplastics", Plastics Technology, Apr., 1986, 89–92, FIGS. 1 and 2. This creates a delicate balance between thermal degradation/depolymerization on the one hand and insufficiently low melt viscosity on the other hand (unable to freely flow into tight spaces and around numerous pins, without great molded-in stresses, knit lines or orientation-induced shrinkage variations, all of which are revealed in subsequent plating or high-temperature soldering operations), either condition leading to bad product.

Of particular interest herein is means for attaining optimal melt quality in reciprocating-screw injection molding of optically-clear thermoplastic products such as ophthalmic spectacle lenses, visors and goggles, information-storage optical disks for audio, video, or computer, and precision optical lenses for instruments and equipment. The remaining examples of the present invention shall focus upon such reciprocating screw optical molding of transparent thermoplastics, though the invention is not so limited.

The particular needs and requirements of this field can dictate substantially different approaches and theories commonly employed in other screw-plastication apparatus and methods. Most technical papers, publications, and issued patents involving thermoplastic plastication are directed towards extrusion processes, not injection molding. Until very recently, screw designs and other improvements to plastication apparatus had to take into account the needs of two entirely different functions performed by the extruder: (1) melting the thermoplastic; and (2) pressurizing the resulting melt, in order to drive it uniformly through the extrusion die.

Other factors in extrusion screw-and-apparatus design involve, for example, the compounding or intensive mixing function (especially when heterogeneous materials are combined); energy efficiency of the process; maximizing output (pounds per hour), stabilizing output (minimizing variation in die swell, or reducing variations in instantaneous output per unit of time); and preventing thermal degradation or polymer scorch by excessive melt temperatures and excessive residence times (with shear being a major contributor thereto). As a result, most extrusion processes have placed high priorities on such parameters and variables, but these represent inherent trade-offs or compromises against achieving optimal melt quality and freedom from unmelt. Thus, much of the "conventional wisdom" of plastication, being derived as it is from extrusion processes, directly contradicts the needs of those screw injection molding processes which require the best possible melt thermal uniformity and visco-elastic homogeneity consistent with minimal polymer degradation, such as is required by the specialized processes for precision optical injection molding of thermoplastics.

QUALITY REQUIREMENTS FOR OPTICAL MOLDING

Optimum plastication conditions for optical injection molding could be defined as that combination of design and setup parameters which provides: (1) no significant or detectable unmelt, per test below; (2) minimum melt temperature variation from start of shot to completion of shot (minimum "delta T"); and (3) melt temperature average which is well below the onset of thermal degradation yet sufficiently high to provide low-viscosity melt for easy flow and cavity fill.

To obtain these three criteria of general optical melt quality, and in particular, the minimization of unmelt, a plastication process which does not prematurely break up or disperse the solids bed into the molten fraction is desirable (see FIG. 3). Therefore, premature distributive mixing (as would be necessary with heterogeneous reinforcements or fillers, alloy polymers or color dispersion masterbatches co-introduced in physically discrete particles or pellets along with matrix-polymer pellets into the feed section) is undesirable for optical injection molding reciprocating-screw plastication. Specifically, deliberate shearing or intensive mixing during the melting phase is to be avoided as much as possible. Only after complete melting has occurred and there can be no chance therefore of premature solids bed breakup should any deliberate shearing or distributive mixing be allowed or attempted. (However, material transfer across a "melt weir" intended to screen out and retain unmelt particles from out of the melt stream in either the transition or metering sections may be necessary and inherently induce a degree of shearing action therein.)

In general, optical molding requires the transparent plastic be plasticated and delivered to the mold cavity in such a fashion as to prevent any optically-heterogeneous flaws ("micro" scale) or regions ("macro" scale) during part formation in the mold cavity. Optically-heterogeneous flaws include all manner of things which either bend light differently (i.e., possess differing refractive indices) or transmit light non-uniformly (i.e., gel particle or opaque or black speck), as well as localized regions of such dissimilar light-bending character (such as by melt flow line or knit line in the molded part).

Flaws or deleterious regions may also be due to refractive index change by means of internal, molded-in stresses or orientation (such as would be shown under polarized light inspection or by means of birefringence tests). Thus, during melt filling and flow in the mold cavity, all portions of the delivered incoming shot should be optimally of precisely the same melt temperature and melt viscosity, from the beginning of the shot to the end of the shot, and furthermore, the cavity should be filled in a manner creating minimal molded-in stresses and layers of orientation (according to the well-known fountain-flow theories of mold filling).

Inherent to all optical molding processes is higher-than-average mold temperatures, in order to reduce molded-in stresses and non-uniform flows. As a result, optical molding processes' long cycle times are almost always controlled by mold-cooling time, rather than melt-plastication time being the rate-determining step. For example, the thinnest of such optical moldings are optical disks, which may be as thin as 0.05 inch, and which typically have a molding cycle time of less than 15 seconds. A spectacle lens of 0.080–0.120 inch typically runs 0.75–1.5 minutes cycle time. Very thick semi-finished lenses for ophthalmic use often run 0.250–0.400 inch thick, and may require a cycle time of 2.5–4.0 minutes.

From these examples, one can see that very rarely will full-screw recovery or plastication time be hurried or will maximizing the out-put of the plastication screw be a consideration in production out-put. On the contrary, conventionally-sized injection-screw units of molding machines for optical uses typically would be grossly oversized, with a resulting excessively long residence time in the barrel and resulting polymer degradation. This latter property is a frequently noted problem with the preferred thermoplastics in optical precision molding, which employs acrylic and polycarbonate as the most common resins of choice.

Polycarbonate, in particular, is known as a thermoplastic with a "narrow processing window"; i.e., the permissible operating latitude in going from the one extreme of underplastication (characterized by low melt temperature but also very viscous and stiff flows, resulting in difficult cavity fill with high levels of molded-in stress, as well as considerable "unmelt", or particles of solid-pellet resin which was never successfully fully molten and homogenized), to the other extreme, excessive melt temperature and time, which leads to polymer degradation.

THERMAL DEGRADATION

The most easily recognized type of optical flaw related to plastication processes is thermal degradation, whether it be observed by yellowish or brownish discoloration of the entire molded plastic or by localized opaque black specks and brown swirls of degraded and carbonized polymer.

SURFACE GEL PARTICLES AND CLEAR SPECKS

Frequently, these clear specks are assumed (improperly) to be caused by airborne inorganic particles such as dust and dirt; such incorrect identification of the source of the problem leads to seeking answers in improved air-filtration systems and white-room procedures. In practice, however, often these molded surface clear specks are not the product of airborne foreign matter at all. Nor are they necessarily polymer gels (crosslinked 3-dimensional macromolecules of the base thermoplastic polymer). This can be proven by means of micro FT-IR (microscopic Fourier-Transform infrared spectroscopic analysis). Surprisingly, our experience with optical polycarbonate has been that even when visual microscopy shows such surface clear specks to have non-spherical, irregular boundaries, which might lead one to assume it is an inorganic bit of dust, micro FT-IR analysis shows that it has the same spectra as its adjoining polycarbonate matrix resin, which proves that not only is it not of foreign matter composition at all, but not even polycarbonate gel or crosslinked particles, which would have significantly different IR spectra.

These insights into the source of such often erroneously identified surface clear specks challenge assumptions of plastication. Perhaps the most common cause of such clear specks in polycarbonate optical moldings is improper plastication, which permits incompletely melted bits of polycarbonate resin pellets to pass through the plastication screw, and become part of the next shot accumulated in front of the screw tip. Once such a sufficiently large particle of "unmelt" enters this melt pool, it is relatively unlikely to completely melt, since plastic is a poor thermal conductor, and the necessary heat required to fully melt the remaining bit of unmelt must be from either thermal conductivity or mechanical shear frictional heating. Since the accumulated shot is only very slightly mixed by the retracting motion of the reciprocating screw, it is, for all practical purposes, a stagnant melt pool. Furthermore, since typically the only thermal-conductive heat sources are the barrel or nozzle-heater bands, only that boundary layer of the melt pool which is in direct contact with such heated surfaces is likely to be significantly warmed beyond whatever temperature it was at when the polymer was transferred ahead of the screw tip.

This analysis of the unmelt problem and resulting optical molding problems provides insights into improved plastication means which may be unconventional and in sharp contrast to extrusion-derived plastication theory.

PRIOR ART

The previously mentioned, less desirable type of screws which have unnecessarily great shearing and distributive mixing are those which either (i) place some sort of restrictive element or flow disruption element into the screw channel itself (generally towards the latter part of the transition zone or metering zones, at which point a substantial fraction of the polymer has been melted; or (ii) have undulating compression-decompression regions built into the material flowpath.

A large number of patents feature restrictive or flow disruption elements and are listed among the references cited but are not individually discussed herein due to their common limitation of necessarily great mixing and high likelihood of permitting unmelt particle or premature solids bed break-up, thus rendering poor melt quality unsuited for optical molding.

Of the second common type of screw, (often termed compression-decompression screws) the most commercially popular such screw is the double-wave screw by HPM. The principal feature of this specific screw is that the root diameter in each channel of two equal width channels, separated by an undersized flight which serves as a barrier for melt passage and unmelt retention, is not constant but rather varies through a continuous function having minimum and maximum values, which, when viewed axially resembles the travel of a rotating elliptical cam. Furthermore, by design, the varying channel depth on one of the adjacent twin flights is shallow while simultaneously its twin across the melt-barrier channel is relatively deeper. This continually reverses, thus forcing plastic back and forth across the barrier, and the contents within any given flight are then subjected to alternating high and low shear.

Another type of compression-decompression type screw design is described in the Sokolow patent (U.S. Pat. No. 3,998,438), which provides for a series of hemispherical pockets cut in predetermined locations within the barrel cylinder wall, which has the intentional function of presenting localized enlargements to the channel depth, thus creating a transfer of the contents of that flight radially, first, into, and then, second, out of the pocket in an alternating decompression-compression mode. This materials transfer, of course, results in breakup of any solids bed present at that point in time and distribution therefore of unmelt particles throughout the melt matrix.

For this reason, these decompression-compression type screw designs are unsuited for highest melt quality free of unmelt and for optical molding thereof.

A special case of deliberately intensive shearing and mixing action in a plasticating-screw design is the Meiki Dynameltor (TM). This method of reciprocating-screw plastication for injection molding combines starve feeding with high RPM, high-compression-ratio screw design to produce an intensively shear-mixed and -melted melt of reportedly good thermal uniformity. The rationed feed of resin at rates far less than required to fully fill the channel depth and flights, of the screw is critical to the working of the Dynameltor principle, since only in this fashion can very short residence time be guaranteed and, thus, minimizes its inherently large thermal degradation and depolymerization effects on the plastic. Thus, the Meiki is best suited for applications requiring distributive mixing or color uniformity and particularly those melting processes of engineering thermoplastics which can be run at short molding cycles. Long molding cycle time and corresponding plastication residence times tip the balance against the Dynameltor due to the frictional heating and resulting thermal degradation. Thus, while Meiki's have been used commercially in compact disk optical molding, they are able to do so only because it is the shortest molding cycle of the optical thermoplastic molding applications. Even in optical disk, this particular means of plastication is known to produce relatively higher levels of black specks and other effects of thermal degradation.

Yet another type of improved screw design for some plastication applications is the screw-within-a-screw type, both the solids-draining type such as the SDS screw by Scientific Process and Research; U.S. Pat. No. 3,924,842; and the XLK screw by Somerset-Hardig. Both of these employ a stationary core screw held by a fixed breaker plate bolted into the end of the barrel cylinder. These screws do have benefit in separating melt from unmelt and rendering improved melt quality but have only been commercially useful in extrusion processes. Such designs are inherently unsuitable for reciprocating-screw injection molding due to lack of suitable non-return valve or check ring during the rapid-axial-travel injection phase, at which point the reciprocating screw must act as a plunger. Insufficient seal reduces net injection speed and moldfilling efficiency, as well as compromising shot size control and shot-to-shot reproducibility. Such material backflow/leakage also adds to its residence time and possible thermal degradation. For these reasons it is considered unsuited to precision injection molding by its manufacturer (XLK is no longer available for that purpose).

Probably the most useful type mentioned so far for optical injection molding purposes would be the twin-flighted melt-barrier type of screw design now popular both in extrusion and injection molding and including a large number of specific designs or embodiments. A good description of some of these designs is given in the Spirex "Screw and Barrel Technology" reference. Of these, leading commercial examples include the Sterling design (U.S. Pat. No. 3,375,549 and U.S. Pat. No. 3,271,819), the Somerset-Hardig MC-3, and the BARR2 (U.S. Pat. No. 4,405,239) and others in the references cited, including especially U.S. Pat. No. 3,375,549 (Geyer-Uniroyal), U.S. Pat. No. 3,271,819 (Lacher), and U.S. Pat. No. 4,000,884 (Chung).

In each case, the twin-flighted melt-barrier screw creates two distinct channels, separated by a melt-barrier flight of smaller diameter than that of the primary flight, thus allowing melted plastic to transfer from the solids bed (which is maintained under continuingly smaller flight channel depth and thus continuingly increased compression) into the continuously expanding volumes of the melt channel. See FIG. 3 in which an axial cross-sectional view is contrasted between a conventional single-stage screw design and the twin-flighted melt-barrier type.

Although the melt-barrier type of screw has comparative advantages over the previously mentioned types in terms of reduced unmelt and potentially better melt quality, it still melts the plastic with vast majority of the energy input coming from mechanical shearing and frictional heating rather than thermal conductivity and shear minimization; the more intrinsically viscous the thermoplastic polymer, the greater shear will be required, all other things the same. Unfortunately, the preferred polymers for optical molding (polycarbonate especially) are among the most viscous.

Another disadvantage of such predominantly shear-induced frictional means of melting is its lower energy efficiency vs. direct electrical heating elements. The reason is that the required energy (enthalpy) put into the plastic by shearing work from screw rotation must pass through several lower efficiency processes to get there; the inherent limited efficiencies of electric motors and hydraulic pumps and screw drives, the internal energy losses in oil flow-drag and compression-decompression and others, all combine to permit only 50–60% of input energy to reach the melt. Contrast that with about 90% for a well-designed, properly insulated electrical resistance heating element.

Still, relatively downsized injection units (reducing the shotsize capacity rating compared to what would commonly have been combined with the clamping portions of the molding machine) in combination with the twin-flighted melt-barrier screws has been the most generally preferred "state of arts" for optical thermoplastic molding to date.

Of special attention is the Chung (U.S. Pat. No. 4,000,884) reference. Chung mentions only in passing certain possible embodiments which might be construed to be similar to certain elements of the present invention:

1. A sloped or curved screw surface in the transition from screw root diameter into the secondary melt barrier flight Col. 5, lines 40-47: "The beginning edge of secondary thread 7 most conveniently arises vertically from the floor of the feed channel 5, but may be a sloped or curved surface, if desired, as viewed in the direction of the screw axis. This edge may be blunt, tapered, rounded, or other desired shape. Preferably, it is shaped so as to minimize resistance to the advancing stream of molten and solid material."

None of Chung's drawings picture this; they show only a vertical flight which is perpendicular to the screw axis. Only the last line states the intended function, which evidently is to aid the melt to make the 90 degree change in flow direction smoothly by means of substituting a radiused "inside corner" for a sharp "right angle." Also, without such a blended transition, mechanical stresses will concentrate in the "sharp" inside corner at this junction of screw root and flight. Any machinist knows to avoid this metallurgical "notch" sensitivity problem by putting in a small radius at the "inside corner" transition.

Clearly, Chung means to leave the rest of the melt barrier flight substantially at right angles to the screw axis, other than this brief root/flight transition area.

2. Internal Thermally Active Screw

Column 5, lines 58-61: "Barrel 2 generally has conventional heating and cooling means, also not shown. If desired, core 1a can also be provided with conventional heating and cooling means, also not shown."

No further mention is made, nor shown in drawings, nor any statement of purpose or intent for such means. However, it can be safely assumed that such means did not contemplate use of an electric heating element being used internally in the screw, since at the time Chung filed (July 1975), there were no examples of any use of an electric heating element being used internally in a screw. What was well known and conventionally practiced at that time was the use of a pumped, circulating oil within channels inside the screw, for improved heat transfer in preventing "scorch" in vulcanizable rubber and crosslinkable polymers, and reducing thermal degradation in heat-sensitive thermoplastics such as rigid vinyl.

Neither Chung "similarities" are made unambiguous in their intent nor are claimed to have any explicit beneficial effects which would anticipate the present invention or its objectives, nor are they included in any Chung drawings.

In contrast to all the above is the internally-heated screw type. Improved melt quality should theoretically come about when a greater proportion of the energy input is made through thermal conductivity rather than frictional-mechanical energy input. Conductive heat input to conventional injection molding machines is typically only by means of resistance heaters mounted along the exterior of the barrel cylinder and conductively applied to the plastic only in the actively-wiped melt film residing between the interior barrel wall and the wiping primary flight land, and since thermoplastics are good heat insulators, the only chance for thermally conductive energy inputs into the system have conventionally been confined to that small active heat-transfer surface area geometry. If, on the other hand, much larger amounts of heat could be supplied simultaneously both from inside the screw itself as well as from the barrel wall, melting could take place twice as fast, and much less shearing could be used.

Such a method and apparatus is described by McKelvey (U.S. Pat. No. 4,501,498), but its design and intent are specific to extrusion processes. One complication of injection molding is the reciprocating transverse motion of the screw within the barrel, so electrical contacts via slip ring between the screw's internal resistance heating elements and the high-voltage power and low-voltage control circuitry is much more complicated and problematical in the case of injection molding than for extrusion processes, wherein these relationships are in a fixed dimension with no transverse motion.

Reed-Prentice, East Longmeadow, Mass. introduced an internally heated single-flighted screw for its TG-line injection molding machines (see Brochure 2M1083, entitled "Reed Internally Heated Screw for all TG Injection Molding Machines," Reed-Prentice Division, Package Machinery Co., East Longmeadow, Mass.). However, this screw has subsequently been withdrawn from the market and is no longer commercially available, nor is anything similar known to be for sale currently. Problems occurred in maintaining electrical contact and specifically in maintaining the low-voltage control circuit required. Whereas high-voltage power is much less sensitive to imperfect contact as may be expected with a reciprocating motion slip-ring design, inherently the low-voltage control circuit is more susceptible to such problems.

Another problem with the McKelvey and Reed design was that a melt pool quickly forms at the interface of the screw at its root diameter and the plastic, while simultaneously a melt film is being formed at the barrel-wall interface. Although it is desirable to provide a very-high percentage of the required energy input for melting via thermal conductivity, it is undesirable to permit the solids bed to not be maintained under positive feeding and continuous compression, since otherwise the solid bed could break up and, thus, introduce unmelt particles. In practice, too rapid melting and the internally stagnant melt pools thus resulted in the single-flighted screw channels being "flooded" and unable to provide this positive compressive force to retain the solids bed in its desired position (in continuous contact and compression between the cylinder wall and the screw root diameter). Screw slippage or inconsistent plastication output and melt quality thus resulted. McKelvey's emphasis on energy efficiency and minimizing polymer heat history surprisingly overlooked the inherent thermal inefficiency of allowing a stagnant-melt film to form beneath the solids bed which, having nowhere else to go nor means to escape such prolonged contact with the hot screw surface, both acts as a thermal insulator against further heat transfer to the remaining solids bed (which now "floats" on the stagnant melt film) and undesirably prolongs localized contact heating depolymerization or scorching. Less surprising is McKelvey's inattention to such "micro" views of melt quality, such as freedom of "unmelt" particles caused by not keeping the solids bed under continuous compression; "macro" perspectives such as reduced die-swell variation vs. time and output rate (lbs/hour) vs. energy input or R.P.M. are his priorities.

OBJECTIVE OF THE INVENTION

The objective of the present invention is two-fold and interrelated:

1. Minimizing heat history in injection molding thermoplastics.

Heat history may be defined as the math integral of the Melt temperature (when plotted on the Y axis) over Time (when plotted on the X axis). Thus, it can be easily seen that two different methods of plastication can convert a given a solid thermoplastic pellet resin into melt of a certain same temperature by two entirely different paths having entirely different resulting heat history. Clearly, minimizing heat history involves "ramping up" rather quickly the melt temperature for a short interval of time or, correspondingly, over a given axial travel along the screw, when viewed from the standpoint of plastic flow within the apparatus.

2. Improving melt-quality of the molten thermoplastic readied for injection delivery into the mold.

Melt quality is defined in terms of homogeneity (i.e., uniformity of temperature, viscosity, etc.) and, in particular, for optical molding, a freedom of objectionable solids, whether they are under-plasticated (i.e., unmelt) or over-plasticated (i.e., carbonized products of thermal decomposition).

The present invention, in brief, provides for the achievement of these two objectives by providing for a way to greatly increase the thermoplastic's melting rate through applying additional thermal energy provided from within an electrically-heated screw operated at least at the melting or softening temperature of the thermoplastic, in combination with mechanical elements which ensure continuous compression of the solids bed, to provide a positive driving force for transfer of the melt films formed at both screw and barrel surfaces as rapidly as they are formed, along with constructive means for melt transfer paths. The later are important, since even partial blockage by solids would inhibit the necessary flow of the melt films away from the electrically-heated surfaces, thus, slow or retard the overall melting rate. Also, such "low back pressure" type of melt transfer means are needed to allow for the clean separation of melt from solid plastic, in order to achieve the melt-quality criteria. Mechanical design of the solids channel of the double-flighted melt-barrier-type screw geometry, in turn, is critical to assuring this continuous positive compression of the solids bed within its channel. This objective is achieved by reducing this solids bed channel depth in a manner to correspond (volumetrically greater than or equal to) with the melting rate and rate of heat transfer at that point on the screw.

SUMMARY OF THE INVENTION

The present invention provides an improved method and apparatus for providing melt quality suitable for thermoplastic reciprocating-screw molding processes generally and optical thermoplastic injection molding specifically. In particular, such method and apparatus employ a relatively higher amount of the required energy for thermoplastic melting via thermal conductivity (by means, for example, of electrical resistance heaters both internally to the reciprocating screw and externally via barrel heater bands) and relatively smaller amounts of frictional heating energy via mechanical shearing. In the novel manner disclosed herein, the solids bed is preserved intact and under continuous compression, and positive feed is maintained until the polymer is completely melted, and thus, unmelt particles are particularly minimized.

Broadly, the invention includes a method for plasticizing thermoplastic polymer using a reciprocating-screw machine of the type having a barrel with a screw operatively mounted therein, the screw having a root, shank and tip and forming a solids channel and a melt channel with a melt barrier flight operatively disposed therebetween, including:

(a) feeding the polymer in its solid form into the barrel proximate the screw shank thereby establishing a solids bed;

(b) rotating the screw within the barrel thereby causing the melt barrier flight to engage the solids bed and effecting relative motion between the barrel and the solids bed;

(c) externally heating the barrel to a temperature above the thermoplastics' liquification temperature thereby producing a barrel wall melt film on the outer surface of the solids bed proximate the barrel wall;

(d) internally heating the screw to a temperature above the thermoplastics' liquification temperature thereby producing a screw surface melt film on the inner surface of the solids bed proximate the root of the screw; and (e) transferring the barrel wall and screw surface melt films from the solids channel to the melt channel, thereby substantially eliminating melt accumulation in the solids channel and accumulating melt in the melt channel so that the solids bed is continuously forced into close thermal contact with the barrel and the screw throughout the plasticizing process, whereby the polymer proximate the screw tip is substantially devoid of objectionable solids.

The screw is an internally heated reciprocating screw utilizing electrical resistance heating elements at a settably predetermined and uninterrupted current flow and voltage (thus eliminating need for low voltage control and sensing circuit). Further, the internally heated screw is preferably of a double-flighted melt-barrier type design as well known to the art, except that the screw provides:

(a) suitably sized apertures (slots, ports, holes, grooves, tracks, notches, relief angles being cut into or through the intervening melt barrier flight between the two adjacent channels) or, alternatively, by a substantially nonvertical barrier flight. Either embodiment is a novel means maintaining fluid communication between the lowermost portion of the solids bed (i.e., that portion interfacing with the root diameter of solids channel) and the adjacent melt channel; and (b) suitable adjustment in the increasing root diameter of the solids channel, to start and to end of the transition zone; the adjustment being desirable to assure that a constant compressive force is exerted upon the diminishing contents of the solids bed, since the melting rate is relatively faster (per unit of screw length) than would be true of conventional screws without internal heating.

Optionally, but preferably, neither said solids channel or melt channel should be allowed to terminate in an open-ended flight which would permit unencumbered passage of unmelt particles to advance past the screw tip and into the accumulated melt pool forward of the tip. At least one unmelt-restrictive dam element or closed-end flight of precise clearance to the barrel should be incorporated, to function as a melt-passage-weir. One such means would be a suitably-clearanced Maddock head at the terminal end of the screw. Another technique would be to dam off each channel at the end of the transition zone, forcing the contents to travel through a suitably-dimensioned restrictive gap between the damming closed-end flight land and the barrel wall.

Both techniques have the effect of filtering the molten polymer stream and retaining unmelted particles in the restrictive gap wherein they are rapidly and completely melted by frictional shearing heat.

Preferably, additional thermal energy input is provided by conventional electrical resistance heater bands mounted externally to the barrel cylinder.

The barrel heater energy inputs are preferably operated under settable (preferably PID or $PID^2$) control and with regulation of variable electrical energy input thereto to maintain the desired set point, by means of a low-voltage control circuit. The band heaters' setpoint is, preferably, in turn adjusted accordingly depending on actual melt temperature readings taken (most preferably by infrared sensor means) at a location internal to the barrel and between the screw tip end and the injection nozzle. Variation of this melt temperature reading outside statistically derived limits causes an appropriate change in the barrel heater band setpoints.

BRIEF DESCRIPTION OF THE DRAWINGS

FIG. 3C is a cross-sectional view of a standard double-flight screw.

FIG. 3D is a cross-sectional view of an internally heated double-flighted screw according to the invention.

THEORY AND MECHANISMS

Figure 1:
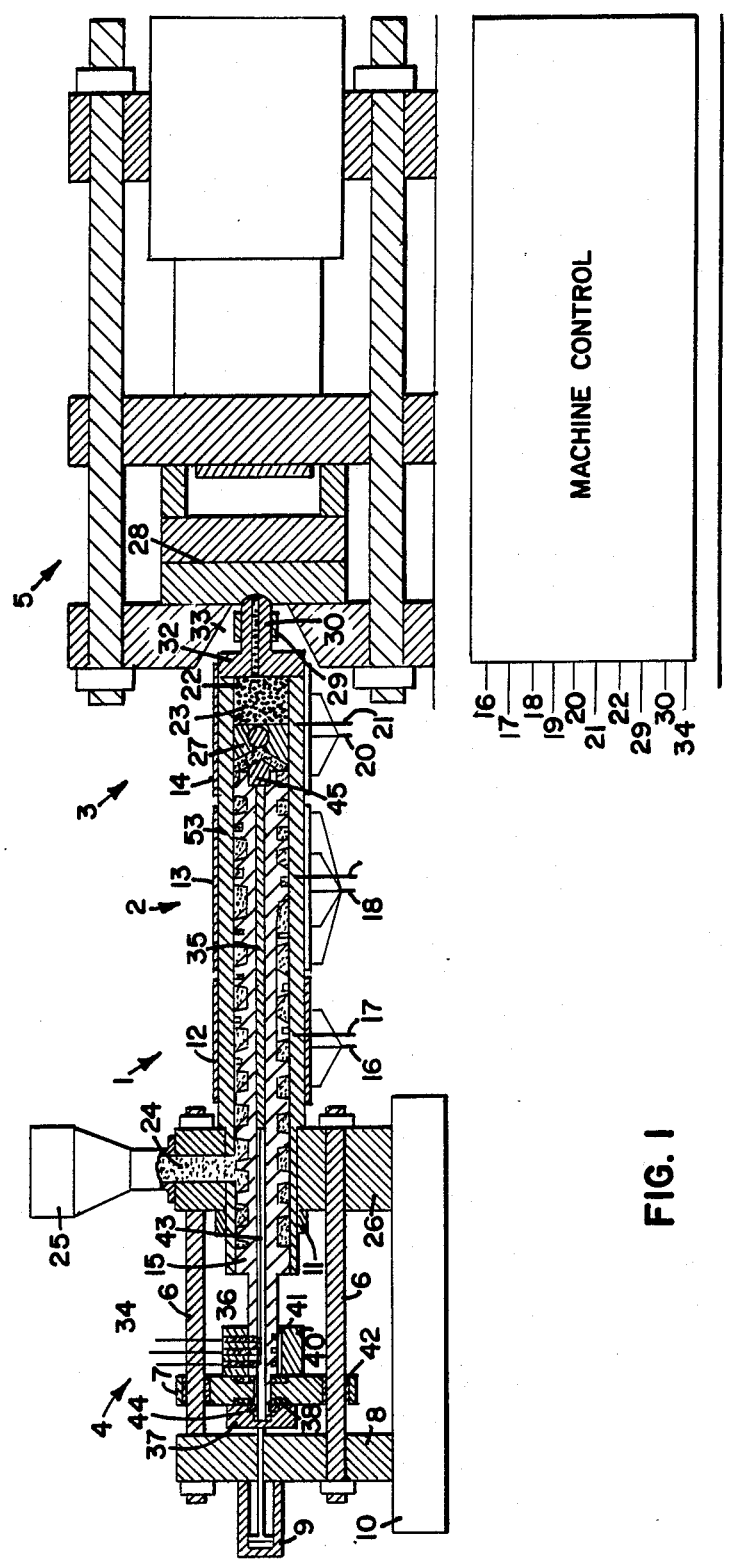
FIG. 1 shows a side elevational view in partial cross-section of an injection molding machine including a plasticating reciprocating-screw mechanism according to the invention.

For single-flighted, general-purpose screw designs for single-screw extruder machines, a commonly-applied model for predicting its dynamic viscous pressurization and flows is that of an infinitely-long, parallel-plate geometry with upper plate moving at a constant velocity and lower plate stationary, which generates a drag-induced flow and pressurization mechanism. (See Tadmor, et al., *Principles of Polymer Processing*, John Wiley & Sons, 1979 text.)

However, this model is an imperfect representation of the conditions actually experienced, for the following reasons:

1. It assumes isothermal conditions, whereas even in the conventional or extruder or reciprocating-screw, injection/molding machine, at least the barrel surface (corresponding to the moving plate) is heated at a temperature above the melting point of the thermoplastic.

2. It assumes no slip at either wall surface.

3. It assumes the fluid is Newtonian and incompressible, whereas, thermoplastic macromolecules are inherently non-Newtonian and can be substantially compressible, both in solid and liquid form.

Given the visco-elastic nature of thermoplastic macromolecules, in actuality, rather than the pure model, a stiction model, or "stick-slip-restick," seems generally more acceptable. That is, the plastic may adhere to the metal surface of the screw for a certain period of time, until shearing stresses overcome the reduced friction at the boundary condition (especially in the presence of any liquid melt films), at which point slippage or relative motion between the two occurs for a brief period of time until again the plastic adheres to the metal.

Further complicating this whole model is the presence at any point n time in the melting or transition section of the screw a certain amount of melt or liquid film in contact with the solids channel screw surface along with solid contacting said surface. The ratio or percentages of said surface contact occupied respectively by liquid and solid would be predictive of greater or lesser degrees of stiction-type slippage, respectively, other factors equal.

Another way of viewing detrimental effect of liquid plastic or melt films at the screw surface is by use of models from lubrication theory, which finds the use of a fluid between two surfaces moving relative to each other to reduce friction by substituting fluid friction for solid friction. Ideally, the fluid lubricant completely separates the two surfaces in what is known as full-fluid-film lubrication, in case the surfaces are completely separated and the lubricant film exerts a pressure between said surfaces.

Now looking at the case at hand, wherein both screw and barrel surfaces are electrically heated to elevated temperatures above the plastic melt or softening point, the original drag-induced flow model is very greatly compromised. In order to prevent full-fluid lubrication from occurring, or at least satisfactory levels of stiction-type slippages, another mechanism needs to be found, and this is provided in the present invention by the continuous positive compression of the solids bed. This feature provides a pressure-induced flow mechanism (such as would be common with a plunger operating on a fluid within a cylinder). In this case, the pressure applied to the continuously-compacted solids bed within the solids channel of the electrically-heated screw exerts pressure upon the liquid-plastic melt films as soon as they are being formed upon the heated screw surface, to drive these melt films away.

Although this positive solids bed compression is a necessary condition for the present invention, it is not by itself sufficient unless combined with a path for allowing such transfer of liquid plastic that is highly resistant to being blocked by a compressed solids bed and also that operates at high transfer rates with minimum back-pressure resistance. In order to permit maximum melting rates during operation, two such types of modified screw design provide such a transfer path and are disclosed in the application:

1. A substantially nonvertical barrier flight (the "ramp" type).

2. A "plurality of apertures," each sized to preclude entry by objectionable solids, which start at the root diameter of the solids channel and run upward and over or through the melt-barrier flight.

Thus, by the novel combination of internal electrically heated screw with these special modifications to conventional double-flighted melt barrier screw designs, the desired objectives of very high melting rates and high melt quality is achieved in reciprocating screw in injection molding of thermoplastics.

DETAILED DESCRIPTION OF THE INVENTION

OVERVIEW OF THE PLASTICATION PROCESS

Referring now to FIG. 1, the present invention generally employs a well-known molding machine, with the injection unit fitted with control and monitoring circuits as shown. Injection molding reciprocating screws are most commonly of a one-stage design (although two-stage designs with a low-pressure section are used for vented-barrel devolatization of the melt). In either system, pellet or powder thermoplastic resin 24 is fed from a hopper 25 mounted on the inlet end of a plasticating screw 15 encased in a constant-diameter barrel 53. In the case of the single-stage screw, the screw has at least two, and usually three, separate processing zones (though the screw is physically cut of one piece of monolithic metal): (1) feed, (2) transition, or melt, phase, and (3) metering (optional).

The process starts as solid thermoplastic pellets 24 enter through the feed throat into the feed zone 1 of the screw, which has historically been defined by a constant root and a single helical flight of constant pitch. However, design of the channel depth (i.e., distance from the land of the screw flight to the root diameter) herein is sufficient to provide positive conveyance of the still-solid polymer 24 along the helical channel but also provides enough compression for densification of the solids bed as well as imparting some frictional shearing forces at the polymer interface with the barrel and screw flight. This mechanical frictional energy, along with thermal conductive energy from heating elements, causes the temperature of the polymer to rise at the same time as the screw conveys the polymer into the start of the transition or melting zone 2. Here the root diameter constantly increases with a resultant intensification of shear and compression forces to which the polymer is subjected. In the transition zone 2, the polymer first begins to melt and by its end essentially full melting is desired. At the start of the metering zone (none shown on FIGS. 1 and 2), the ultimate melt quality is largely determined, for better or worse. In the optional metering zone, channel depth and volume of each flight (if any flights are used; some designs are flightless or others omit this zone entirely) again becomes constant and the mass flow rate of the polymer melt along this zone is regulated, more pressurized, and thereafter, the polymeric melt 23 is deposited in front of the discharge end 3 of the screwtip assembly. By such means as a check ring or backflow valve 27 mounted on the discharge end of the screw, the melt cannot re-enter the screw channels and, as additional molten material is so deposited, the screw 15 continues to revolve and retract until a predetermined space beyond the discharge end of the screw is filled with the polymer melt 23. Once this distance corresponding to the desired shotsize volume is attained, the reciprocating screw 15 is now ready to become a plunger. Upon signal from the process sequence controller 31 of the injection molding machine, the screw traverses forward, acting like a plunger and thereby forces the polymer melt 23 through the nozzle 29 into the mold 28 which is held closed by the clamp unit 5, wherein the melt is cooled and solidified and, upon mold opening, is ejected. Then the mold re-closes, and the process is repeated for another cycle.

Figure 2:
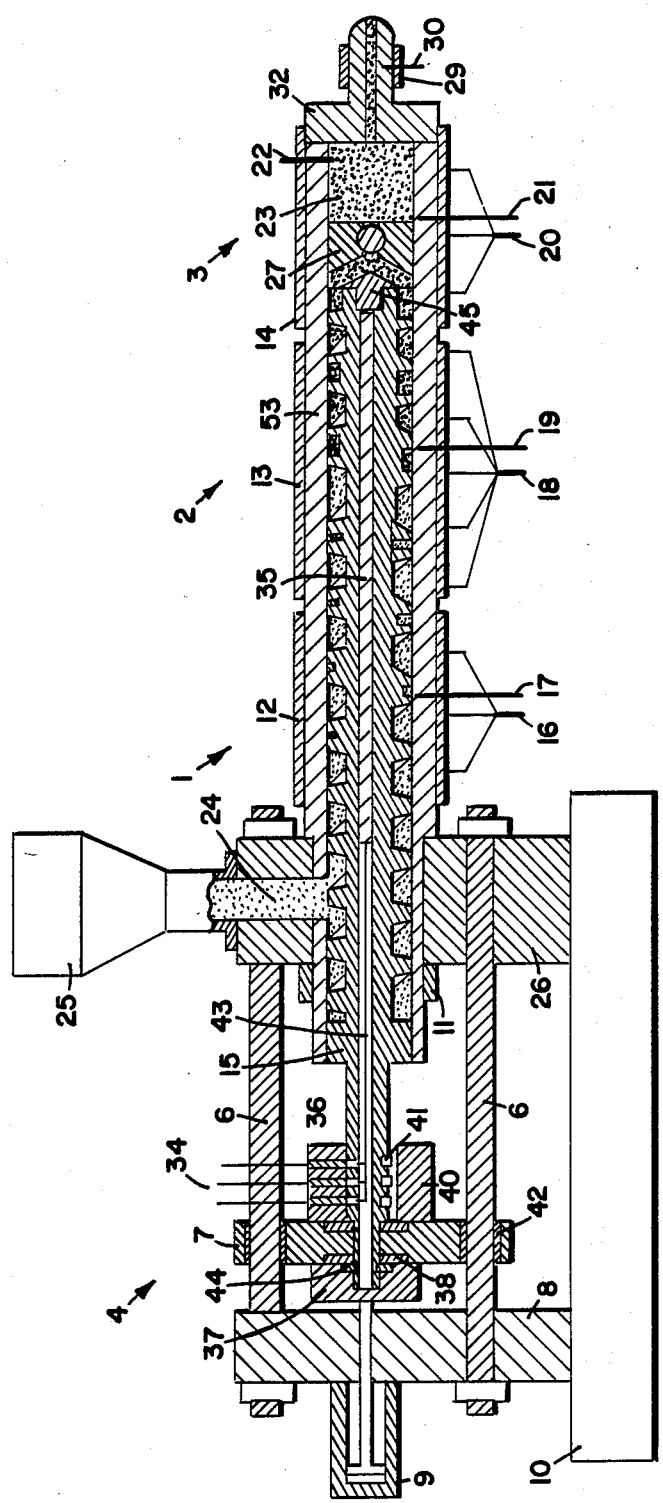
FIG. 2 is an enlarged side elevational view, in cross-section, of the plasticating reciprocating-screw mechanism of FIG. 1.

Turning now to the left-hand portions of FIGS. 1 and 2 to look at mechanical and electrical hardware to implement the above process, upon base plate 10 sits the screw injection/drive unit 4. Precise and rigid alignment of drive, screw and barrel components is provided by combination of barrel mount plates 26 (upon which barrel 53, barrel mount jam nut 11, and injection cylinder 9 are then mounted) and injection tie bars 6 (upon which ride the screw drive mount plate 7 on liner bushings 42). Screw rotation is provided by conventional means, through rotary drive 37, with screw 15 turning in stationary plate 7 on liner bushings 38. Screw transverse motion for rearward retraction/plastication is controllably accomplished by cylinder 9 "screw back-pressure" and rotary drive 37 R.P.M. settings. Screw transverse motion for forward plunger-like injection stroke is controllably provided by cylinder 9 "injection pressure" and fill and pack timers.

Electrical current is supplied to screw internal cartridge heater 35 by input power wires 34, which conductively are fixed and joined by means of terminal strip or block to electrical brush contacts 36, which are mounted within stationary brush housing/assembly 40. Stationary contacts 36 then maintain continuous current flow to rotary brush contacts 41, which are rigidly and fixedly mounted on the shank of screw 15 as shown, and which are fixedly joined electrically to power wires 43 of cartridge heater 35. These brush contacts may conveniently take the form of circumferentially mounted slip rings. Also, for best results, all void surfaces of the screw's internal heating cavity should be filled with an thermally-conductive compound (such as Grade GUU Heater Putty, from K Inc. of Wheeling, Ill.).

To avoid prior art problems with low voltage sensing and control circuitry, the present invention preferably employs "open loop" control of the screw's internal heating. That is, input amperage to the screw heater is set and maintained thereafter for the remainder of that setup. No attempt is made to deliberately vary such amperage vs. time, through "on/off" or through PID loop, in response to any sensed temperature (or change thereof).

CONTROL SYSTEMS

The governing principles of the present invention come from the energy balance equation:

$$ET = EWS + EWB + EMT - EL;$$

where:

ET = the total energy inputted into the plastic, and measured either by increments of plastic mass or by increments of time;

EWS = energy inputted to the plastic from the internally-heated screw's electrical resistance heater;

EWB = energy inputted to the plastic through conductive heating from the barrel wall, generated by external band heaters;

EMT = energy inputted to the plastic via mechanical torque and frictional heating caused by the combination of internal plastic back-pressure along with the screw's revolutions as it travels backward during its plastication stroke;

EL = energy lost from the system due to heat dissipation, etc.

For any given thermoplastic optical molding setup, the screw RPM is almost always controlled by the relatively slow cooling rate of the plastic optical molding. Since it is undesirable to run excessively high RPM or back-pressure (both combine to result in excessive shearing), and since the molding cycle time is determined, not by the plastication rate, but rather by the mold cooling rate, in most cases optical thermoplastic molding setups require a suitably slow screw RPM setting such that the screw completes its full return just briefly before the mold cooling is completed and the mold is ready to open. To have too fast a screw RPM would then have the disadvantage of the screw being idle at the end of its return stroke and the accumulated melt pool ahead of the screw tip awaiting injection becomes rather stagnant and beginning to thermally stratify into layers, with the warmest material being that next to the barrel and nozzle, and the coolest tending to be that which is near the centerline of the passage or that which is just ahead of the screw tip. As previously pointed out, such thermal gradients are undesirable for optical molding.

Therefore, for any given thermoplastic optical molding setup, RMM tends to become a constant, as does back-pressure, and their combined effect therefore representing the mechanical frictional energy and torque derived energy inputted becomes also a constant for that setup.

An objective of the present invention is to minimize mechanical shearing energy inputs and to maximize thermal conductivity energy inputs. The latter is provided by the sum of the thermal energy from the screw and that from the barrel heater bands. For reasons discussed earlier, it is difficult to maintain accurate electrical low-voltage control circuit. Therefore, the most readily maintainable and simplest means is to dial in a certain amperage at the start of each operational setup and treat it as an open loop control parameter. Thus, for any given setup, the energy input of the screw is assumed to be constant as is the RPM and frictional energy.

This then leaves the heater band energy input as the principal means of varying thermal energy on a closed-loop basis, and it in turn is correlated with the actual melt temperature taken ahead of the screw tip, as described earlier, by means of preferably infrared-sensor optical device and fiber optic combination. Typically it includes a sensor 22 flush-mounted internal to the barrel wall or nozzle adapter and which contains a sapphire window, through which infrared radiation can freely pass in a focused direction which permits a reading to be taken at a specified distance from the barrel wall and sensor location (thus avoiding the inaccuracies inherent in contact thermocouples and the well known surface-effect, gradient-layer problems). This infrared radiation is then passed back through fiber optic cables to a charge-amplifying device coupling, which in turn then turns the amplified signal back to the electronic instrument, where it is translated into a digital temperature reading. Readings may be taken continuously and instantaneously or may be taken at their maximum and/or minimum readings for any given molding cycle; this reading can then be automatically data-logged into a suitable microcomputer which is programmed with decision rules based on upper and lower control limits statistically derived. If such reading falls within the specified control limits, no action is taken, but if the reading is outside these statistically-derived control limits, then action can be taken either by automatically reloading a new program with new heater-band temperature settings into the molding-machine control system (in the case of a CNC-type, i.e., computer-numerical-controlled, microcomputer-programmable machine controls), or in the event of a less automated system, an audible alarm can be sounded, which requires the operator to examine this new melt-temperature reading and adjust accordingly the heater-band temperature settings upward or downward.

Since screw-supplied heating power EWS (in watts) thus becomes a virtual constant for any given setup, the real controlling time-based variable in the equation given above is EWB, the heater band wattage. Almost all modern molding machines come factory-equipped with multizone PID proportional heater band controls as part of their machine control systems 31; any other machines not already so equipped can be retrofitted to PID. For each zone (1, 2 and 3) pictured in FIG. 2, there is a heater band power wire (16, 18 and 20, respectively) and a heater band thermocouple (17, 19 and 21, respectively).

A possible further improvement on PID is adaptive $PID^2$; it claims to minimize temperature overshoot by adding the second derivative of the temperature-vs.-time function ("temperature acceleration") to conventional PID ("temperature change") control. In effect, it predicts temperature change before it occurs. Such a system is available from Gammaflux, Inc. of Sterling, VA; Model 943.

MELTING MECHANISM

FIG. 3 shows comparative cross-sectional views of four different types of plasticating screws: (a) conventional general purpose, single-flighted screw; (b) internally-heated, single-flighted screw (e.g., Reed); (c) conventional double-flighted, melt-barrier screw; and (d) internally-heated, double-flighted screw of the present invention (shown in this example with melt-barrier-flight-contour-cut tracks for melt transfer).

As these schematics show, only in the case of the latter design is the most rapid melting rate achieved (i.e., minimal time at highest temperatures, resulting in less polymer degradation), but also minimal mechanical shearing degradation, while at the same time, the solids bed is continuously under positive compression and unable to float or break up into unmelt particles, as well as thus forcing intimate contact with both heated surfaces for maximum melting-rate efficiencies.

Figure 3A:
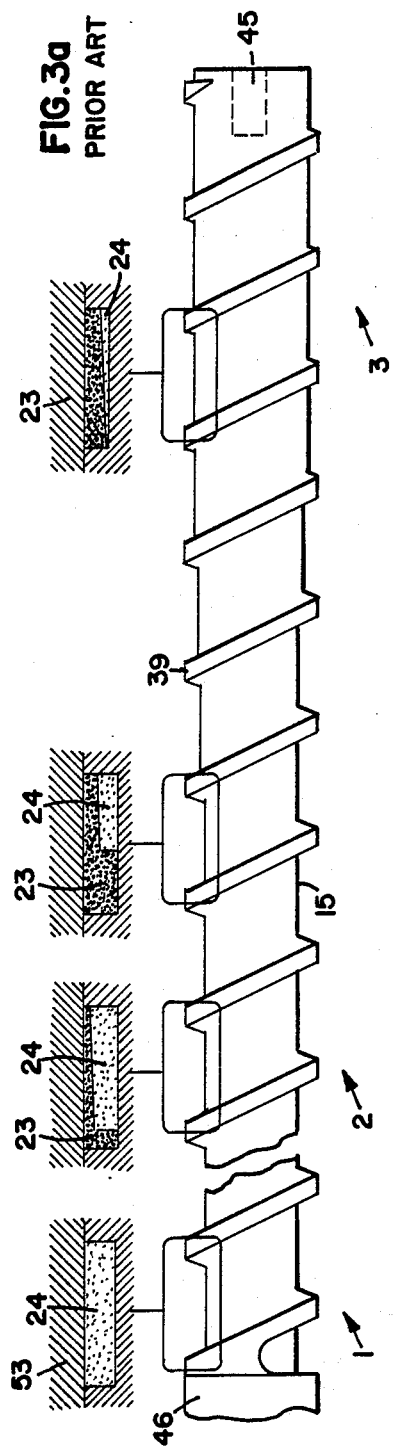
FIG. 3A is a cross-sectional view of a standard single flight screw.

Note FIG. 3a, showing premature solids bed 24 breakup and subsequent unmelt dispersed into the melt pool 23.

Figure 3B:
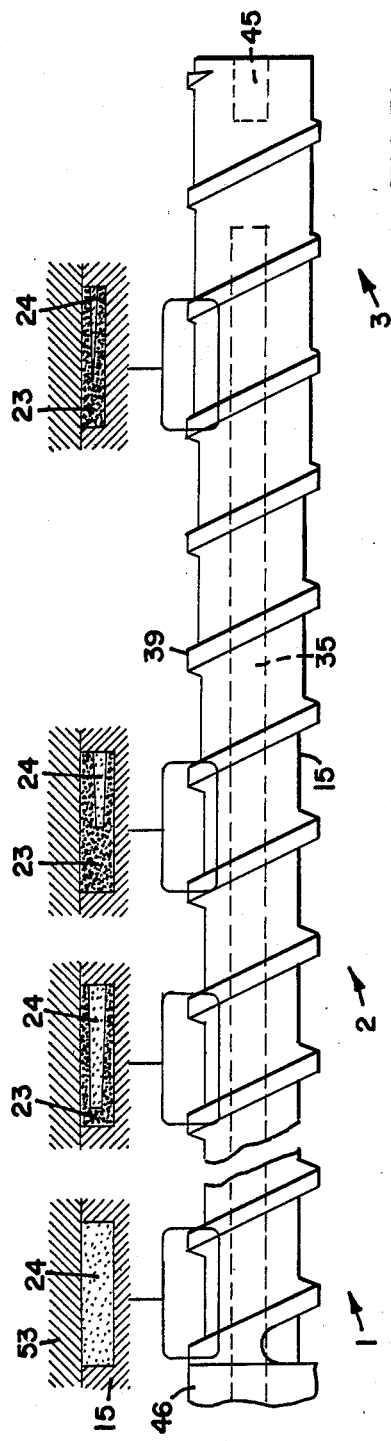
FIG. 3B is a cross-sectional view of an internally heated single flight screw.

FIG. 3b shows an internally heated screw of conventional single-flighted design. Note the solids bed starts to float and break up as melt forms on the heated screw surfaces but has nowhere to go.

FIG. 3c shows a typical double-flighted melt barrier screw with no internal heating. Note how much longer the transition must be, due to its reliance mainly on frictional heating, which provides much slower melting rate per unit of screw length or per unit of material path travel; this longer residence time at elevated temperatures can cause depolymerization. Also note this particular design shows both solids and melt channels terminating wide open at the end of the transition zone joining into the metering zone, thus allowing any remaining unmelt particles to advance unimpeded into the accumulating melt pool (though other commercially available melt barrier screws don't have this design flaw).

FIG. 3d shows one design according to the present invention. Note the comparatively few turns required for melting, and the shorter overall screw length; also shown is optional but preferred solids-channel-bottom-draining ramp 49 design, with melt-transfer tracks cut therein.

FIGS. 4, 4a, 5, 5a, 6, and 6a, show only three examples of the many possible combinations of melt barrier flight contour and melt-draining apertures according to the invention. In each case, the left-hand view is a cross-sectional axial view of the screw, and the right-hand view (labeled "a") is a cross-sectional end view of the same screw.

Figure 4:
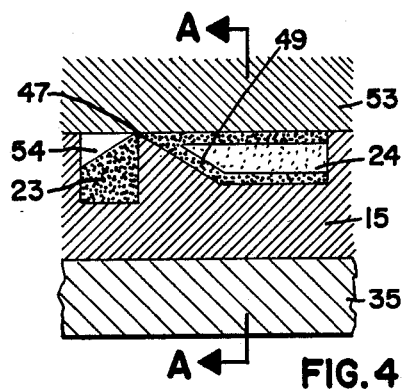
FIGS. 4 and 4A through 6 and 6A are side and end sectional views of three alternative designs for melt-transferring pathways according to the invention.
Figure 4A:
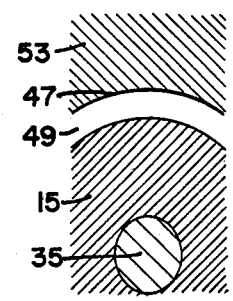

FIG. 4 shows the solids bed 24 compressed forward against the primary flight and root diameter of the screw 15, by means of the unconventionally rapid increase in this root diameter of the solids channel. Thus pinned between the internally heated screw 15 and the barrel wall 53-both of which are provided with electric heating elements, and are thus maintained at temperatures above the thermoplastics' liquification temperature throughout the transition zone; a cartridge or rod type 35 for the screw, and heater bands (not shown) for the barrel-the thermoplastic polymer soon forms melt films on both surfaces. This pressurized melt under the solids bed is driven up the inclined ramp 49 leading to its outlet 47 into the trailing melt channel, wherein accumulates melt 23 and a tiny void volume 54-shown here in exaggerated proportion. (As mentioned earlier, the melt channel's volume is desirably slightly oversized in relation to calculated melt volume, to preclude any possible "flooding" of the solids bed by melt unable to escape, and thereby loss of continuing positive compression on the solids bed). A second reason for assuring the volume of the melt channel equals or exceeds the calculated melting rate volumes would be to provide slight "starved feed" effects, which promotes melt devolatilization by allowing slight gaseous clearance between the upper part of each primary flight and the barrel wall.

One advantage of this type of melt-draining design is that this substantially nonvertical "ramped" melt barrier flight is comparatively easy to fabricate and to maintain free of blockages or degraded materials. This is in contrast to conventional screws having essentially vertical flight surfaces (disregarding radiused top and bottom transition surfaces to avoid knife edges or 90° notch-sensitive inside corners respectively). When a line is drawn tangent to the average contour of the barrier flight surface, and that tangent line is extended to intersect the screw axis, the resulting angle is measured for all conventional prior art screws, that angle is generally 85-90° and never less than 75°. For the "ramped," substantially nonvertical barrier flight designs of the present invention, that angle is always less than 75° and preferably 30-65°.

Figure 5:
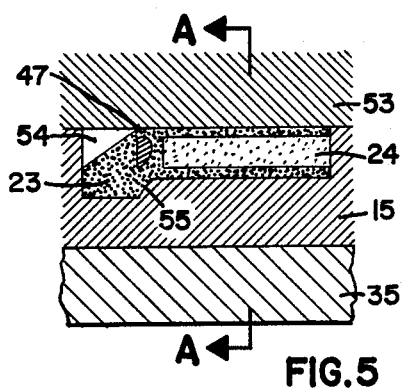
Figure 5A:
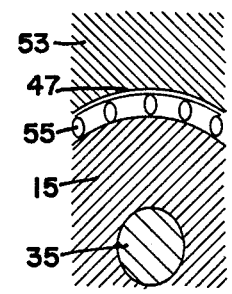

FIGS. 5 and 5a show the same principles of melting and melt-drainage, except that, instead of the recessed tracks climbing a gently-ramped melt barrier flight, they tunnel through it-leaving the top-most portions of that flight and its land intact. This provides a submerged outlet for the melt, and a slightly shorter path for the melt to travel.

Figure 6:
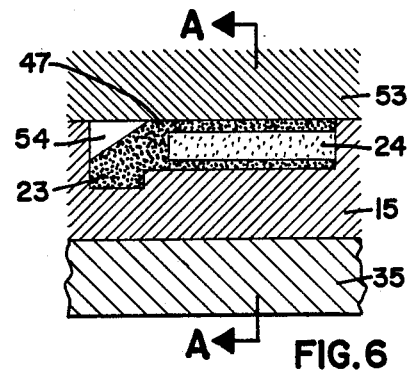
Figure 6A:
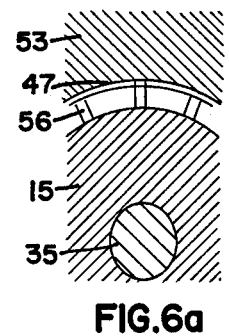

FIGS. 6 and 6a similarly show the same principles of melt transfer of FIGS. 5 and 5a, except here the aperture continues vertically upwards, leaving no intact flight land. This slot configuration is also relatively easy to cut and maintain.

The percentage of melt formed at the screw surface versus barrel surface in conventional unheated screws is quite small by contrast to the present invention, typically 40-400% smaller.

This percentage of melt formed at the screw surface versus barrel surface is determined not only by the respective surface metal temperatures of screw and barrel, but also the relative transfer rates of melt removal out of the solids channel and into the melt channel. Without the required aperture-cut or ramped-barrier-flight means for fluid communication at minimal back pressures, plus positive solids bed compression, the melt film at the screw surface becomes stagnant, and insulates the remaining solids bed, thus slowing further melting at the heated screw. Since the melt film at the barrel surface is constantly being "wiped" over the melt barrier flight by the relative motion of the screw rotation, its efficiency is assured. Thus, if the barrel and screw temperatures are equally hot, but the melt film stagnates at the screw surface, the net melting rate per unit of screw surface area will be worse than the barrel's.

In summary, many possible aperture geometries, numbers and spacings, and configurations are possible and are contemplated in the present invention, provided only that such designs meet the following conditions: (1) for any given aperture's aspect ratio, the smallest dimension must not exceed that required to exclude objectionable "unmelt" particles; and (2) the sum of all such apertures' cross-sectional areas, plus that of the clearance between barrel wall and melt barrier flight land, in any given flight, should be sufficiently large so as to allow free and adequate melt transfer rates so as to at least match the rate of melt formation in that flight's solids channel.

APERTURE SIZES

In order for any given design of aperture to properly perform its function of melt filtration and transfer yet unmelt particle retention, the critical dimension (when viewing the aperture cross-sectionally from the axis of the screw) would be that which is smallest, i.e., in a rectangular aperture, the "width"; in a circular hole configuration, the diameter. Generally, the preferred geometry of the aperture when viewed cross-sectionally approximates a rectangular slot (such are most easily machines and maintained), but in the case of submarine apertures not breaking the melt-barrier flight and land, a circular hole would probably be most practical to fabricate and maintain. In each case, these critical dimensions in the aspect ratio of the aperture must satisfy the condition that this minimum dimension is less than the smallest initial diameter of the unmelt particles which will yield objectional "clear specks" in the final molded product, for that particular thermoplastic polymer and processing setup conditions, as explained below.

When solids-bed-breakup fragmentation occurs, a full distribution curve of such unmelt particles is scattered throughout the molten plastic matrix. Since, by definition, the surrounding molten thermoplastic is above its melting-point temperature, immediately some melting occurs on all sides of the unmelt polymer, and its dimensions as a solid start to shrink. As one can easily visualize, these unmelt particles therefore quickly take the shape of a spheroid with a certain diameter, which continues to shrink as a function of time (as melting continues, but at a slowing rate, since plastic is a relatively poor heat conductor), temperature gradient (difference between temperature of surrounding melt and temperature of solid unmelt particle), and intrinsic melting parameters inherent to that particular thermoplastic polymer (such as its specific heat and, in the case of crystalline polymers, the required latent heat of fusion specific to that particular polymer). These last factors can vary considerably from thermoplastic to thermoplastic. For example, compare a common amorphous engineering thermoplastic such as polycarbonate with a common crystalline thermoplastic such as nylon. Polycarbonate has a specific heat of 0.3 BTU/lb/degree F and latent heat of fusion is 56 BTU/lb. Thus, if solidsbed breakup of both should occur and an initial equal-sized distribution curve for each were to be identical, at any particular time and temperature gradient thereafter, the remaining particle-size distribution of the two different plastics would be expected to be different.

Thus, in order to assure that the molded part is ultimately free from objectionable clear specks, some unmelt-particle size "critical threshold value" must be obtained before injection occurs. Below this criticalhreshold value, unmelt particles having less than this minimum dimension at this stage will not be a problem because melting continues until finally the molded part solidifies and is determined empirically to be sufficiently complete to yield good quality product, free of objectionable melt. However, above this critical dimension, such melting will not reduce the unmelt particles' diameter sufficiently to make it not noticeable visually or optically. This critical-threshold dimension for unmelt will vary from setup to setup and polymer to polymer according to the list of variables mentioned earlier, but as a generalization, an aperture dimension in the range of 0.020–0.050 inch and, most preferably, 0.030–0.040 inch appears sufficient to provide the necessary melt filtration yet is large enough to permit ease of fabrication and maintenance of the screw.

SCREW DESIGN

Several principles of screw design of the present invention are pictured in FIG. 4. The first principle is that, for any given flighted turn (in the feed zone, the screw is single-flighted, in the transition zone it is double-flighted), the volumes of either solids or melt-channel cross-sectional volumes may not be equal, but for the combination of each turn's melt channel and solids channel volumes will be approximately equal:

$$VM1 + VS1 \approx VM2 + VS2$$

Another principle is that melting rate should be proportional to the solids channel root diameter calculated as it steadily increases with increasing downstream location along the screw axis. This change can be expressed as a slope of the resulting line in X,Y coordinates, where Y is the root diameter and X is the screw axial location. Even in the transition zone, there may be more than one such slope since melting rate is not necessarily linear throughout the transition zone. Also, due to the relatively faster melting rate of the present invention compared to any one of the three alternative prior art designs of FIG. 3 (in constant R.P.M.), in general such a slope will be steeper, but the overall length of the transition zone will generally be shorter than such conventional designs.

CHANGING SOLIDS-BED ROOT DIAMETER VERSUS CONVENTIONAL SCREWS

Since the need for continuously-applied positive compression of the solids bed is essential to prevent its breakup and release of unmelt particles as well as operational efficiency of melting action, root diameter in the solids channel is critical. This dimension is a function of:

1. Watt density of the internal screw heater at that particular point on the screw. It may be desirable to have a nonuniform heat flux via differential electrical heater windings;
2. Contact time between the plastic solids bed and the heated-screw root-diameter surface (which, in turn, is a function of screw-speed RPM);
3. Inherent melting-rate parameters of that particular thermoplastic polymer (specific heat or heat-transfer rate; also, latent heat of fusion for crystalline polymers, as mentioned in the earlier section regarding aperture size).

Thus, the faster the heat-transfer rate and lower the total heat required to melt a given thermoplastic, and/or the longer its contact time with the screw in that particular position of the screw and/or the higher the emanated heat flux from the screw (a function of wattage density at that point), then the faster the overall melting rate will be at that point, and therefore, the steeper the rate of increase in the solids-channel's root-diameter must be. Correspondingly, the shallower the solids-bed channel must be in order to keep the solids bed continuously "pinched" between barrel wall and screw solids-bed root-diameter surface. Conversely, the greater the heat demand for melting and/or the slower the heat transfer rate inherent to that particular thermoplastic polymer and/or the shorter the contact time and/or the lower the heat flux and wattage density emanating from the screw at that point, the more gradual the increase in root diameter versus axial length for that particular combination of screw-heater, RPM, and plastic polymer selected. When compared to prior art screws which lack internally-heating elements, the inherently higher melting rate per unit of screw length traveled requires a correspondingly greater increase in the rate of increase in solids-beds root diameter. As a generalization, such a relatively steeper slope of increasing root diameter vs. screw axial length may require increases of 40–400% in the compression ratio compared to such non-internally-heated screws. For instance, a generally accepted low-compression-ratio screw recommended for polycarbonate is 1.5:1.0. For screws of the present invention provided with a fast-melting wattage rating in the latter stages of the melting or transition zone of the screw, a 2:1 to 3:1 compression ratio at that point of the screw would work better. For any given combination of screw-compression-ratio design and heater, when used with any specific thermoplastic polymer, there will be an optimum range of screw RPM's and barrel-heater temperature settings to give best results.

Also, the sectional view in FIG. 4 shows a sample design of a radial-cut screw and pictures first the melt-barrier flight's clearance between the barrel wall as a circumferential gap with a cross-sectional area AMB (area of melt barrier clearance) given by the formula:

$$AMB = (3.1416)(r1-r2)^2$$

where r1 is the radius from screw centerline to barrel inside wall, and r2 is the radius from screw centerline to the barrier flight land; and with draining ports pictured as shown, with resulting total area of draining pathways ADP:

$$ADP = (a1 + a2 + \ldots + an).$$

The total cross-sectional area (AT) available through which melt may thus travel in that given flight is given by the formula:

$$AT = AMB + ADP.$$

Also, the product of such area (AT) times the melt transfer rate MTR across the barrier flight should be greater than or equal to the melting rate MR of the optical thermoplastic in that particular molding setup, for best results.

$$MR < or = AT \times MTR$$

MELT QUALITY PROBLEMS

TEMPERATURE

Often, thermal uniformity of plasticated melt is cited in technical publications or patents, but in practice these measurements are suspect because of the slow-reacting nature of conventional thermocouples which, until very recently, were the only practical means of measuring melt temperature. Whereas in extrusion processes a steady output is sustained with few radical changes of instantaneous temperature, reciprocating-screw injection molding processes typically deliver the accumulated shot in only one or two seconds, before shifting into the packing phase of the molding cycle. This very fast materials transfer of the accumulated melt ahead of the screw by its plunger mode has until recently caused most molding processors to either not measure melt temperature whatsoever or to do so with a slow-responding nozzle-installed thermocouple, which provides only some sort of "time-averaged" reading of the melt temperature for that shot.

Now, however, there are new means for instantaneous, accurate measurements of melt temperature via optical infrared sensing of the moving melt stream, without melt flow obstructions of conventional thermocouples. Such fast-responding (1000× faster than thermocouples), infrared-sensed melt temperatures can be mounted both in the plastication apparatus (mounted in the barrel, nozzle adapter, or nozzle housing) or in the mold (mounted into a mold-cavity surface or sprue or runner knockout pin configuration).

Another common problem of thermocouples is erroneous readings caused by surface thermal effects. The optical fiber infrared approach avoids such problems by putting the surface film (<1.0 mm thick) "out of focus" and actually taking readings at a 1–5 mm depth into the plastic polymer. Such an infrared melt temperature system is commercially 10 available through Vanzetti Systems of Stoughton, MA.

"UNMELT" PARTICLES

Another problem plaguing scientific study of plastication has been the inability to verify empirically the theoretical state of melt versus unmelt. For example, when screw designs are tested out experimentally, the most common such test is to feed into the extruder throat a "salt and pepper" mixture of black-and-white, opaque, precolored resin pellets of the same base thermoplastic polymer. Then, at a particular experimental set-up condition, the heat and screw RPM are stopped, the plastic is solidified in place, the barrel cylinder is pulled, and the solid plastic is stripped from the screw and crosssectionally analyzed visually for degree of melting and for location of solids bed versus melt pool, etc.

For general purpose extrusion and plastication for injection molding, such approximating means are suitable and acceptable; however, for optical molding, where just a few tiny bits of unmelt may cause rejection of the molded plastic optical element, a more discriminating test is needed. Such a modification can be achieved by means of using mostly clear, transparent, water-white resin with a small amount of the same base resin pre-compounded with soluble green dye (black could be confused with carbonized specks). In the case of polycarbonate, such dye commonly is of the azo or anthraquinone chemical families, and the commercial suppliers of polycarbonate pellet resins frequently offer such transparent tints with varying-percent percent light transmissions; a dark green tint of approximately 15% total light transmission at 0.120 inch molded thickness is appropriate, and can be used in a 1:10 ratio with clear in such experimental conditions. Thus, when perfectly plasticized, the resulting molded product will show a very uniform light green color throughout. However, if a degree of unmelt exists, tiny green particles will show up as they have passed through the plastication process without totally becoming melted and homogenized with its predominantly clear matrix of water-white polycarbonate.

OPTIONAL ADD-ON DOWNSTREAM DISTRIBUTIVE

MIXING OR MELT-FILTERING ELEMENTS

Only once complete and thorough melting by means just described is it safe or prudent to consider deliberately adding thereafter means of further filtering (to strain out gels, foreign matter or tiny bits of unmelt) or distributively mixing the now-fluid thermoplastic melt. (Otherwise, solids bed breakup can result.)

Figure 8:
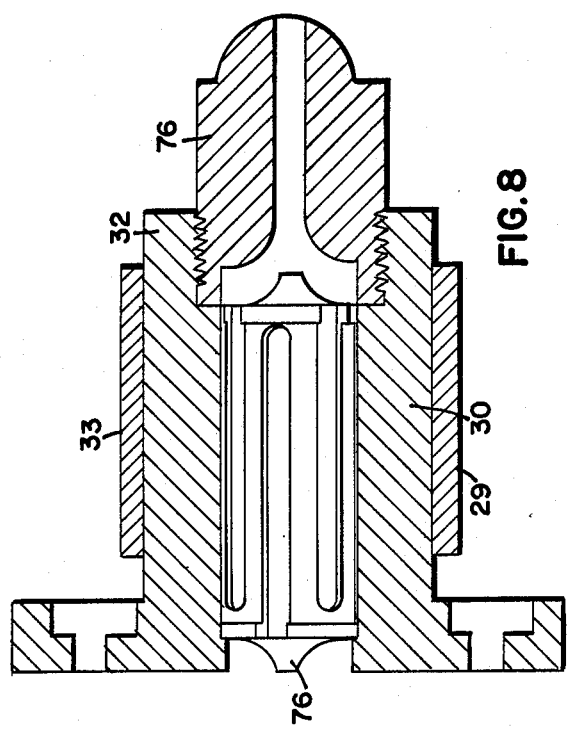
FIG. 8 illustrates a mixing device which can be used in conjunction with the plasticating reciprocating-screw mechanism of FIG. 1.

One such add-on means is a replacement for conventional screw-on nozzle adapter, fitting into the barrel on one end and joining the nozzle tip at the other. See FIG. 8. Internal thereto are stationary structures resembling miniature Maddocks mixers 76, singular (for filtering) or in series multiples (for mixing), in the case of one such device (EMI Corp. of Jackson Center, OH: their Linear Edge model). Others are DME Co. of Madison Heights, MI, or Koch Engineering of New York, NY. All employ the kinetic energy of the highly pressurized incoming melt during its rapid injection stroke to drive the melt through one or more changes in path and/or reduced clearance opening. The resulting constriction-expansion and directional changes accomplish mixing, though at some added melt shear-heating, and slower mold fill due to the pressure drop across such device.

Figure 7:
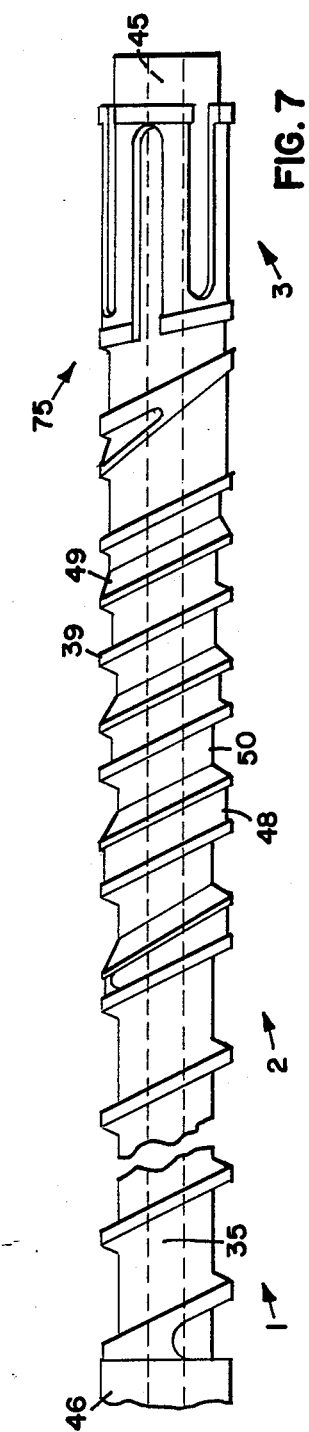
FIG. 7 shows a double-flighted screw according to the invention including a Maddocks mixing head.

Another add-on means is to add another bolt-on length to the barrel, then screw on (in place of conventional screw tip) another section, configured to create melt constrictive passages and/or path changes. See FIG. 7. One such is the common Maddocks mixing head 75 configuration; another such is the previously-mentioned Cavity Transfer Mixer head. These well known "standard" designs, or simply adding flow-disruptive pins or barrier lands into the channels of the metering section, have in common their means of forcing melt mixing by the screw's normal plastication/retraction backward motion and before start of the screw's injection-fill forward stroke. This allows fast mold filling (no added pressure drop in the melt delivery path) but adds shear-heating over a longer time.

An example of such means in optical molding might use very heat-sensitive melt-soluble organic additives. The problem is to uniformly distribute same without thermal degradation. For instance, certain infrared absorbing organic compounds such as triarylaminium salts are effective bandpass filters at extremely low concentrations (0.1%) and are very expensive as well. A suitable approach would use a masterbatch preconcentrate (at 5-20 times higher concentration in the same base polymer), dry-blended with the same 5-20 "let-down ratio" of clear polymer. Simply melting this tumble blended mix of heterogeneous pellets of differing dye content as taught in the present invention would be inadequate to provide a uniformly low concentration in the resulting molding, free from spot-to-spot variations.

POST-MELTING DISTRIBUTIVE MIXING

Using the present example of infrared-absorbing dyes dispersed in clear polycarbonate to make, for instance, a laser-protective visor or goggle, since the incident angle of laser beam could randomly pass through any such line-of-sight angulation between the wearer's eyes and the laser source or reflections thereof. Tumble-blended pellets, only some of which contain the laser-absorbing dye and the rest being clear polycarbonate, are sprinkled loosely into a compression mold, heated and compressed to fully melt, devolitalized and formed into a resulting plastic molding. However, since virtually no shearing or chance of mixing in the melt state could have occurred in such a full-compression molding but rather just simple thermal melting, one can easily visualize the spot-to-spot variations in levels of protection that would occur in such a non-distributively-mixed method of plastic fabrication. Therefore, the preferred means of making such a part would be to first fully melt all these plastic pellets, with a rapid melting rate and with a low-shear input, separating the melt from unmelt or solids as it is formed, and then conveying this filtered melt having minimal heat history into a downstream means of distributively mixing via shearing, changes in melt path direction, or constrictions/impediments thereto. Add-on means of mixing as above would be needed.

Another example might utilize feed (1) and melting/transition (2) sections of the present invention in a combination plastication/compounding and/or fabricating apparatus of modular construction, wherein immediately after completing the polymer melting step as taught herein and immediately downstream of the transition section is a low-compression section (created by greatly increased channel depth in the screw at this point, the twin-flighted solids and melt channels of the melt/transition section (2) have now merged into one). Such low melt pressure sections are well known; each 2-stage injection screw uses same to accomplish melt devolatilization by vacuum venting at this point. Once melt pressure has thus been minimized, such heterogeneous materials as liquids (injected under suitable pump pressure and volumetrically ratioed) or solids (fibrous, particulate or preconcentrated resin pellet forms, augerfed through a secondary feed throat and gravimetrically or volumetrically ratioed) can be introduced in the desired formulation ratios based on relative amounts of base plastic to such additives. Immediately downstream of such addition ports is an intensive mixing section which employs any of a variety of flow-disruptive, path-altering or restrictive, shear-inducing elements, many of which were discussed as Prior Art references herein. Once such distributive mixing has been accomplished, the now-uniformly dispersed melt is ready to be ejected from the melt accumulating chamber, i.e., by forward stroke of the reciprocating screw, in the case of injection molding. Such well known apparatus for "second-stage compounding" are routinely employed, most often in twin-screw extrusion. One such widely-available modular plasticator, which serves well to illustrate by analogy these versatile capabilities, is the Werner and Pfleiderer Model ZSK, Ramsey, NJ.

Preferred embodiments of the invention have been disclosed. Other modifications of the invention which are not specifically disclosed or referred to will be apparent to those skilled in the art in light of the foregoing description. Put simply, this description is intended to provide concrete examples of preferred embodiment structures and applications, clearly disclosing the present invention and its operative principles. Accordingly, the invention is not limited to any particular embodiments or configurations and variations of the present invention which fall within the spirit and broad scope of the appended claims are covered.

We claim:

1. A method for plasticizing thermoplastic polymer using a reciprocating-screw injection molding machine having a barrel with a screw operatively mounted therein, the screw having a root, shank and tip and forming a solids channel and a melt channel, the method comprising:
    (a) feeding the polymer in its solid form into the barrel proximate the screw shank thereby establishing a solids bed;
    (b) rotating the screw within the barrel thereby causing a melt barrier flight to engage the solids bed and effecting relative motion between the barrel and the solids bed;
    (c) externally heating the barrel thereby producing a barrel wall melt film on an outer surface of the solids bed proximate the barrel wall;
    (d) internally heating the screw to at least the melting temperature of said thermoplastic polymer thereby producing a screw surface melt film on an inner surface of the solids bed proximate the root of the screw;
    (e) transferring the barrel wall and screw surface melt films from the solids channel to the melt channel, by providing means of maintaining fluid communication therebetween, thereby substantially eliminating melt in the solids channel and accumulating melt mostly in the melt channel;
    (f) maintaining the solids bed under substantially continuous compression forces between the barrel wall and the solids channel's screw surfaces, thereby maximizing the relative motion of a steadily diminishing solids bed to the barrel wall and minimizing the relative motion of said solids bed and said screw surface of the solids channel;
    (g) reducing continuously the solids bed channel depth at a rate equal to the rate at which the solids bed's occupied volume is reduced by melt formation and transfer, to produce said substantially continuous compressive forces; and (h) maintaining said continuously reduced solids bed to be in close thermal contact with the heated barrel and the heated screw surfaces throughout the plasticizing process, with said plastication melting process thus minimizing breakup of the solids bed before melting is substantially complete, whereby the polymer proximate the screw tip is substantially devoid of objectionable solids.

2. The plasticizing method of claim 1, wherein the barrel heating step comprises electrically heating the barrel.

3. The plasticizing method of claim 1, wherein the barrel heating step comprises controllably electrically heating the barrel.

4. The plasticizing method of claim 1, wherein the screw heating step comprises electrically heating the screw.

5. The plasticizing method of claim 4, wherein the screw heating step comprises electrically heating the screw in open loop fashion.

6. The plasticizing method of claim 5, wherein the barrel is electrically heated through the use of band heaters, whereby a predetermined melt temperature in an accumulated melt pool ahead of the screw tip is maintained by controlling electrical energy inputs to the band heaters.

7. The plasticizing method of claim 6, wherein electrical power to the band heaters is controlled by comparing an actual melt temperature as measured in the accumulated melt pool proximate the screw tip by means of infrared sensors to the predetermined melt temperature.

8. The plasticizing method of claim 3, wherein the barrel heating step comprises PID controlling band heaters operatively connected to the barrel.

9. The plasticizing method of claim 3, wherein the barrel heating step comprises $PID^2$ controlling band heaters operatively connected to the barrel.

10. The plasticizing method of claim 9, wherein the screw heating step comprises providing electrical power to a resistance heater within the screw.

11. The plasticizing method of claim 1, wherein compressed melt in the solids channel can flow over the melt barrier flight.

12. The plasticizing method of claim 11, wherein the melt barrier flight comprises a ramp extending radially downward into the solids channel, whereby melt from the inner and outer portions of the solids channel flows over the melt barrier flight.

13. The plasticizing method of claim 11, wherein the melt barrier flight forms a plurality of apertures in fluid communication with the melt and solids channels, wherein the total cross-sectional area of the apertures provides for a melt transfer rate at least as large as the melting rate of the polymer.

14. The plasticizing method of claim 11, wherein the melt barrier flight forms a plurality of slots in fluid communication with the melt and solids channels, wherein the total cross-sectional area of the slots provides for a melt transfer rate at least as large as the melting rate of the polymer.

15. The plasticizing method of claim 1, wherein the solids channel becomes progressively smaller and the melt channel becomes progressively larger from the shank to the tip of the screw, wherein during the rotating step polymer in the solids channel is continuously compressed to force the melt film from the solids channel to the melt channel through the fluid communication means.

16. The plasticizing method of claim 1, wherein the screw is of a double-flighted design comprising a primary flight in spaced relation to the melt barrier flight substantially along the entire length of the screw, wherein the melt channel is formed between the primary and melt barrier flights.

17. The plasticizing method of claim 15, wherein the melt barrier screw comprises a transition zone intermediate the screw shank and tip and comprises means for terminating the solids channel proximate the transition zone allowing only sufficiently constricted clearance between the terminating means and the barrel wall to preclude passage of any particle greater than a predetermined size.

18. The plasticizing method of claim 16, wherein the double-flighted, melt barrier screw comprises a transition zone intermediate the screw shank and tip and comprises means for terminating the solids and melt channels proximate the transition zone thus allowing only sufficiently constricted clearance between the channel terminating means and the barrel wall to preclude passage of any unmelt particle greater than a predetermined size.

19. The plasticizing method of claim 18, wherein the melted polymer, upon completing passage through the transition zone is distributively mixed by means of obstacles forcing flowpath directional changes and relatively constrictive passages, wherein the flowpath obstacles comprise paired surfaces, one of which is stationary and concentrically encloses the other, and the other of which is rigidly joined to the screw and thus is co-rotating with the screw.

20. The plasticizing method of claim 19, wherein the paired surfaces are located downstream of and external to the barrel, at a point between the barrel downstream end and a mold, so as to intercept the melt flowing therebetween under injection pressure created by a rapid forwardmost stroke of the reciprocating screw.

* * * * *